United States Patent [19]

Fujii

[11] Patent Number: 5,052,179

[45] Date of Patent: Oct. 1, 1991

[54] PUMP DISCHARGE FLOW RATE CONTROLLED BY PILOT PRESSURE ACTING ON VEHICLE DRIVE VALVES

[75] Inventor: Kazuhiko Fujii, Hiroshima, Japan

[73] Assignee: Kabushiki Kaisha Kobe Seiko Sho, Kobe, Japan

[21] Appl. No.: 494,313

[22] Filed: Mar. 16, 1990

[30] Foreign Application Priority Data

Jul. 7, 1989 [JP] Japan .................................. 1-176591

[51] Int. Cl.[5] .............................................. F16D 31/02

[52] U.S. Cl. .......................................... 60/421; 60/444

[58] Field of Search ................. 60/420, 421, 422, 428, 60/429, 430, 443, 444

[56] References Cited

U.S. PATENT DOCUMENTS 3,871,178 3/1975 Tominaga ............................ 60/443
3,987,623 10/1976 Bianchetta .
4,055,046 10/1977 Schexnayder ......................... 60/428
4,073,141 2/1978 Lohbauer .
4,087,968 5/1978 Bianchetta .
4,426,194 1/1984 Pollman ............................... 60/444
4,531,366 7/1985 Moriya et al. ........................ 60/428

FOREIGN PATENT DOCUMENTS 0228707 7/1987 European Pat. Off. .
3237095 4/1984 Fed. Rep. of Germany .
3609399 10/1986 Fed. Rep. of Germany .
55-135342 8/1983 Japan .

*Primary Examiner*—Edward K. Look
*Assistant Examiner*—F. Daniel Lopez
*Attorney, Agent, or Firm*—Oblon, Spivak, McClelland, Maier & Neustadt

[57] ABSTRACT

Described herein is a hydraulic pump control circuit for travelling construction machine, the circuit being of the type including various hydraulic actuators divided into two groups to be driven by first and second pumps, respectively, left and right vehicle drive motors provided in the respective groups, and a change-over valve located on the discharge side of the first and second pumps and switchable to a position for supplying the oil pressure from the second pump in parallel to the left and right vehicle drive motors. According to the invention, the control circuit is provided with a pilot proportioning valve located between a discharge flow rate control regulator for the second pump and a pilot pressure source, and means for applying the pilot pressures acting on left and right vehicle drive valves to pilot ports of the pilot proportioning valve, the proportioning valve being operated by the sum of the pilot pressures applied to the pilot ports to produce a control pressure for the second pump regulator.

1 Claim, 3 Drawing Sheets

PUMP DISCHARGE FLOW RATE CONTROLLED BY PILOT PRESSURE ACTING ON VEHICLE DRIVE VALVES

FIELD OF THE INVENTION

This invention relates to a hydraulic pump control circuit for traveling construction machines, particularly for hydraulic power shovels.

PRIOR ART

Illustrated in FIG. 1 is a prior art hydraulic pump control circuit for a power shovel with an independent vehicle drive mode, in which indicated at $1_L$ and $1_R$ are left and right vehicle drive motors, and at $2_L$ and $2_R$ are vehicle drive valves for controlling the vehicle drive motors $1_L$ and $1_R$. At $3_L$, $3_R$, $4_L$ and $4_R$ are pilot change-over valves for controlling various hydraulic actuators (not shown). At $5_L$, $5_R$ and 6 to 9 are on-off valves which are turned on and off in relation with operations of the pilot change-over valves $2_L$, $2_R$, $3_L$, $3_R$, $4_L$ and $4_R$, respectively. At 10 is a change-over valve, at 11 and 12 are first and second pumps, and at 13 and 14 are regulators for the first and second pumps 11 and 12, respectively. At 15 is an independent vehicle drive command valve, at 16 is a solenoid of the independent vehicle drive command valve 15, at 17 is a hydraulic pressure source for the pilot pressure, at 18 is an electric circuit, at 19 is a switch, and at 20 is an electric power source.

With regard to the arrangements, operations and functions of the prior art hydraulic pump control circuit shown in FIG. 4, the various hydraulic actuators are divided into two groups A and B which are driven by the first and second pumps 11 and 12, respectively, and the left and right travel motors $1_L$ and $1_R$ are located in the respective groups A and B. The change-over valve 10 is located on the discharge side of the first and second pumps 11 and 12 such that the oil pressure from the second pump 12 is supplied in parallel to the left and right travel motors 1L and 1R when the change-over valve 10 is switched into the independent vehicle drive position. When the vehicle drive motors 1L and 1R are operated concurrently with any one of other hydraulic actuators, one of the on-off valves 5L and 5R and the on-off valves 6 to 9 is switched to block the by-pass passage 22 or 23 leading to an oil tank 21. Accordingly, the pilot pressure from the hydraulic pressure source 17 acts on a signal receiving portion a of the change-over valve 10, switching the change-over valve 10 from a neutral position into a straight forward travel position A to permit straight forward travel of the power shovel without meandering motions. Now, in case of an independent vehicle drive operation, upon manually closing the switch 19 in the electric circuit 18, the solenoid 16 is energized and the independent vehicle drive command valve 15 is switched from a tank position C to a pilot-on position D. Whereupon, the pilot pressure from the pressure source 17 acts on a signal receiving portion b of the change-over valve 10 through conduits 25 and 26, independent vehicle drive command valve 15 in the pilot-on position D, and conduit 27. Therefore, the change-over valve 10 in a neutral position is switched into an independent vehicle drive position B, supplying the oil pressures from the first and second pumps 11 and 12 independently to the left and right vehicle drive motors 1L and 1R and actuators in the respective groups. Accordingly, even if vehicle drive is stopped or operation of a working attachment is stopped or restarted while a vehicle is in travel concurrently with operation of the working attachment, there will occur no fluctuation in the vehicle travel speed or in the actuator operating speed.

As described hereinbefore, upon switching the independent vehicle drive change-over valve, the discharge oil pressure of the second pump is supplied in parallel to the left and right vehicle drive motors in case of a construction machine with the conventional hydraulic pump control circuit. In this case, $\frac{1}{2}$ of the quantity of the discharge oil from the second pump is supplied to each one of the left and right vehicle drive motors. However, under these circumstances, if only one of the left and right vehicle drive motors is driven to turn the construction machine for a change of travel direction, the entire discharge oil of the second pump is supplied to one vehicle drive motor in operation, doubling the operating speed of that motor. Such an abrupt acceleration at the time of changing the travelling direction of the construction machine is extremely uncomfortable to the driver and dangerous from the standpoint of safe operation.

SUMMARY OF THE INVENTION

It is an object of the present invention to provide a hydraulic pump control circuit for a travelling construction machine, which can eliminate the above-described problems of the prior art, more specifically, to provide a hydraulic pump control circuit which will not cause an abrupt acceleration in travelling speed even if the construction machine is turned to one direction while travelling with a change-over valve in independent vehicle drive position.

In accordance with the present invention, the above-mentioned objects are attained by the provision of a hydraulic pump control circuit which comprises:

(a) a pilot proportioning valve provided between a discharge rate control regulator for the second pump and a pilot pressure source; and (b) means for applying the pilot pressures acting on left and right vehicle drive valves to pilot ports of the pilot proportioning valve;

(c) the pilot proportioning valve being operated according to the sum of the pilot pressures applied to the pilot ports to produce a pressure for controlling the second pump regulator.

In operation:

(I) When the machine is put in travel by switching the change-over valve into an independent vehicle drive position, the pilot pressures acting on the left and right vehicle drive valves are equally applied as command signals to pilot ports C and D of the pilot proportioning valve. Consequently, the pilot proportioning valve is operated according to the sum of the command signal pressures applied to the pilot ports C and D, producing a control pressure for the second pump regulator. Halves of the discharge oil from the second pump are supplied to the left and right vehicle drive motors according to the sum of the command signal pressures. Alternatively, the command signals to be applied to the pilot ports C and D of the pilot proportioning valve may be produced in relation with the amounts of spool displacement of the left and right vehicle drive valves.

(II) When changing the travel direction of the construction machine mentioned in (I) above, either the left or right vehicle drive valve alone is operated. In this case, the pilot pressure acting on one of the vehicle drive valves is fed to the pilot port C or D of the pilot proportioning valve. The command signal pressure now acting on the pilot proportioning valve is reduced to ½ as compared with the command signal in (I), so that flow rate of the discharge oil from the second pump is reduced to ½ by the regulator. Accordingly, there is no possibility of abrupt acceleration in travel speed at the time of changing the travel direction of the construction machine.

The above and other objects, features and advantages of the invention will become apparent from the following description and the appended claims, taken in conjunction with the accompanying drawings which show by way of example a preferred embodiment of the invention.

DESCRIPTION OF PREFERRED EMOBODIMENTS

Figure 1:
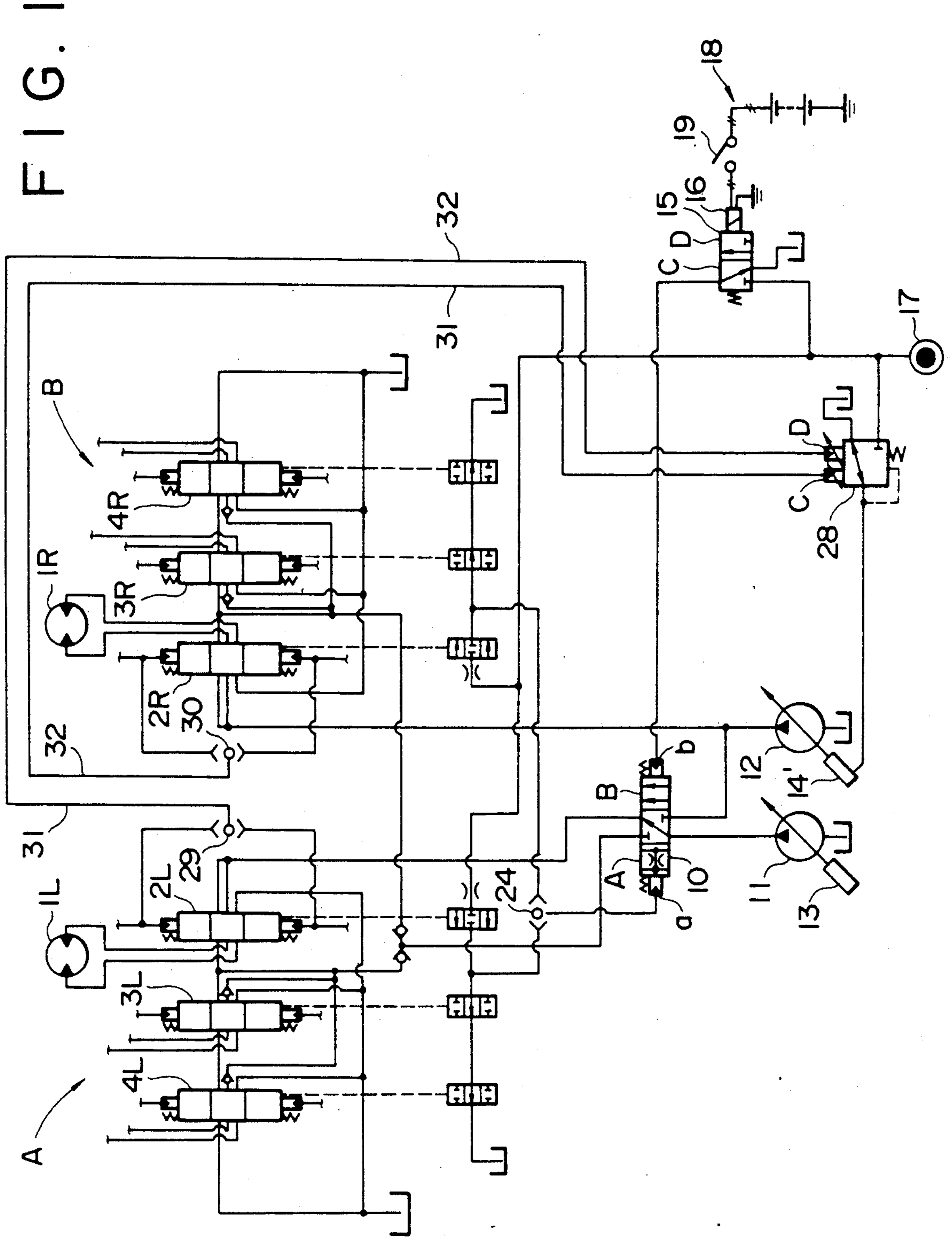
FIG. 1 is a diagram of a hydraulic pump control circuit according to the present invention.

Hereafter, the invention is described more particularly by way of a preferred embodiment shown in the drawings. Illustrated In FIG. 1 is a hydraulic pump control circuit embodying the present invention, in which the component parts common to the conventional counterparts are designated by common reference characters and their description is omitted to avoid unnecessary repetition. The reference 28 denotes a pilot proportioning valve with pilot ports C and D. Indicated at 14' is a regulator for the second pump 12, and at 29 and 30 are shuttle valves which serve to draw out the pilot pressures acting on the left and right vehicle drive valves $2_L$ and $2_R$, respectively.

Referring again to FIG. 1, the construction of the hydraulic pump control circuit of the invention is described hereafter. The pilot proportioning valve 28 is interposed between the regulator 14' for the second pump 12 and the pilot pressure source 17. The pilot pressures acting on the left and right vehicle drive valves $2_L$ and $2_R$ are applied to the pilot ports C and D of the pilot proportioning valve 28 through the shuttle valves 29 and 30, respectively. The pilot proportioning valve 28 is operated according to the sum of the applied pilot pressure to control the regulator 14' of the second pump 12.

Figure 2:
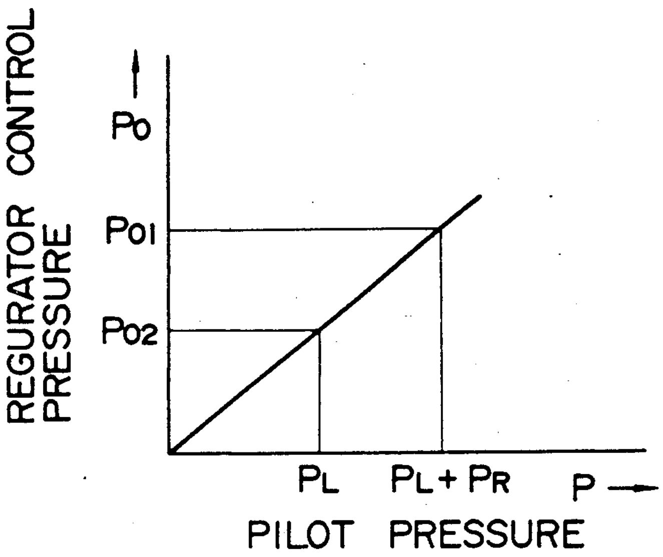
FIG. 2 is a diagram of pilot pressure acting on pilot proportioning valve versus regulator control pressure.
Figure 3:
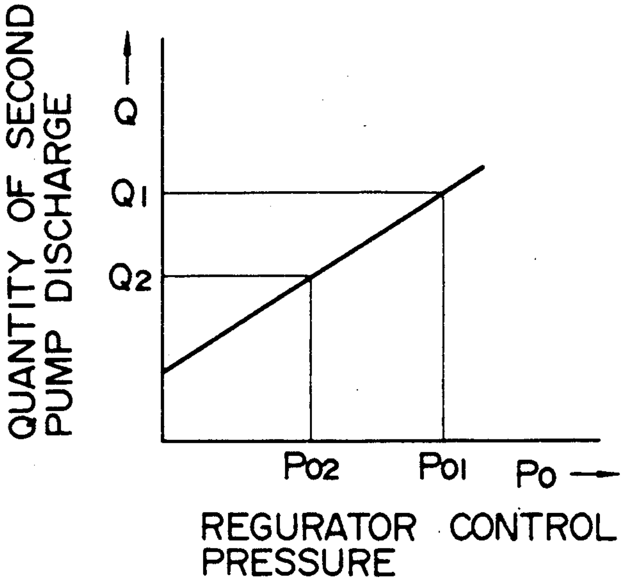
FIG. 3 is a diagram of regulator control pressure versus the discharge rate of the second pump.
Figure 4:
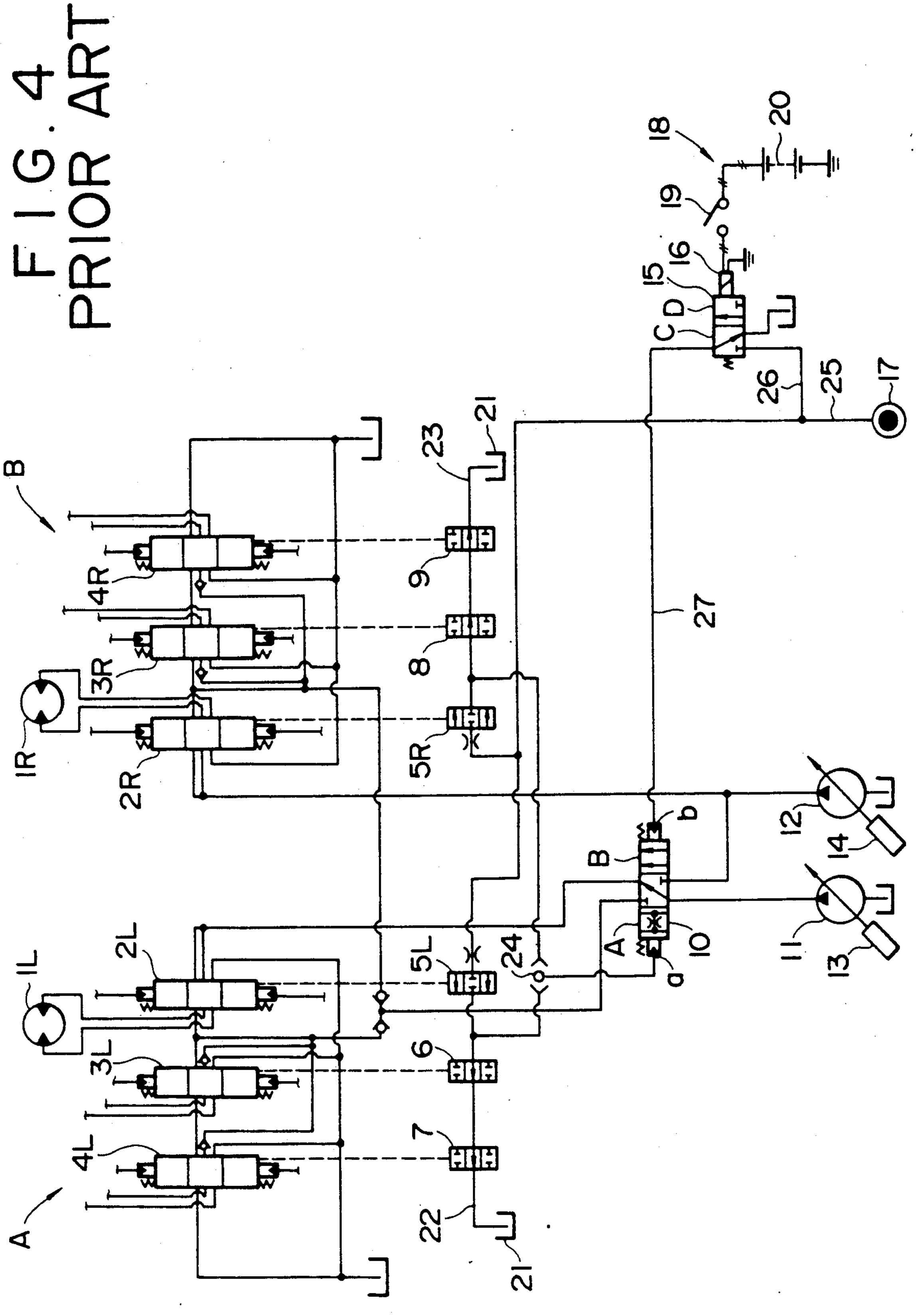
FIG. 4 PRIOR ART
FIG. 4 is a diagram of a prior art circuit.

With regard to the operations and functions of the hydraulic pump control circuit according to the invention, the diagram of FIG. 2 shows the pilot pressure P acting as command signals at the pilot ports C and D of the pilot proportioning valve 28 (i.e., the sum of the pilot pressure $P_L$ and $P_R$ prevailing at the pilot ports C and D) in relation with the control pressure Po sent from the pilot proportioning valve 28 to the second pump regulator 14'. The diagram of FIG. 3 shows the just-mentioned control pressure Po acting on the regulator 14' in relation with the quantity of flow Q of the discharge oil from the second pump 12. When the machine is put in travel by switching the change-over valve 10 into the independent vehicle drive position B (by turning on the switch 19), the pilot pressures $P_L$ and $P_R$ acting on the left and right vehicle drive valve $2_L$ and $2_R$ are equally applied as command signals to the pilot ports C and D of the pilot proportioning valve 28, respectively, shifting the pilot proportioning valve 28 according to the sum of the applied pilot pressures ($P_L+P_R$) to produce a control pressure $Po_1$ (see FIG. 2) for the regulator 14' of the second pump 12. Accordingly, the quantity of flow $Q_1$ of the discharge oil from the second pump 12 (see FIG. 3) is halved to supply $\frac{1}{2}Q_1$ to each of the left and right motors $1_L$ and $1_R$.

Now, let us consider a case where it is intended to turn the construction machine to change the direction of travel, for example, by operating the left vahicle drive valve $2_L$ alone. On such an occasion, the only pilot pressure $P_L$ acting on the left vehicle drive valve $2_L$ is applied to the pilot port C of the proportioning valve 28. Accordingly, the pilot proportioning valve 28 is operated according only to the pilot pressure $P_L$ prevailing at the pilot pressure C, producing a control pressure $Po_2$ (see FIG. 2) for the regulator 14' of the second pump 12. The control pressure $Po_2$ is half the value of the control pressure $Po_1$ produced in response to the sum of the two pilot pressures (PL+PR), so that, as shown in FIG. 3, now the quantity of flow Q2 of the discharge oil from the second pump 12 is reduced considerably as compared with the afore-mentioned value Q1. Consequently, there is no possibility of abrupt acceleration in travel speed when changing the direction of travel of the construction machine.

As clear from the foregoing description, the hydraulic pump control circuit according to the invention is provided with a pilot proportioning valve between a second pump regulator and a pilot pressure source, applying the pilot ports of the pilot proportioning valve with the pressures acting on the left and right vehicle drive valves and shifting the pilot proportioning valve according to the sum of the applied pilot pressures to produce a control pressure for the second pump regulator. Therefore, as the construction machine is put in travel by switching the change-over valve into the independent vehicle drive position, the second pump regulator is controlled by the pilot proportioning valve. Consequently, by use of the invention, one can turn the construction machine to change its travel direction, without causing an abrupt increase in the travelling speed on the turn.

Thus, the hydraulic pump control circuit of the present invention contributes to secure the maneuverability and safety of a travelling construction machine at the time of changing the direction of travel.

What is claimed is:

1. A hydraulic pump control circuit for a travelling construction machine including various hydraulic actuators divided into left and right groups to be driven by first and second pumps, respectively, left and right vehicle drive motors provided in the respective groups, said left and right vehicle drive motors being controlled by left and right vehicle drive valves, respectively, and a changeover valve located on a discharge side of said first and second pumps having a position for supplying an oil pressure from said second pump in parallel to said left and right vehicle drive motors, said hydraulic pump control circuit comprising:

a pilot proportioning valve located between a discharge flow rate control regulator for said second pump and a pilot pressure source; and means for applying pilot pressures acting on said left and right vehicle drive valves to pilot ports of said pilot proportioning valve;

said proportioning valve being operated by the sum of said pilot pressures applied to said pilot ports to produce a control pressure for said second pump regulator.

* * * * *